No. 620,866. Patented Mar. 7, 1899.
W. B. FENN.
RAISIN SEEDER.
(Application filed May 8, 1897.)
(No Model.) 3 Sheets—Sheet 1.
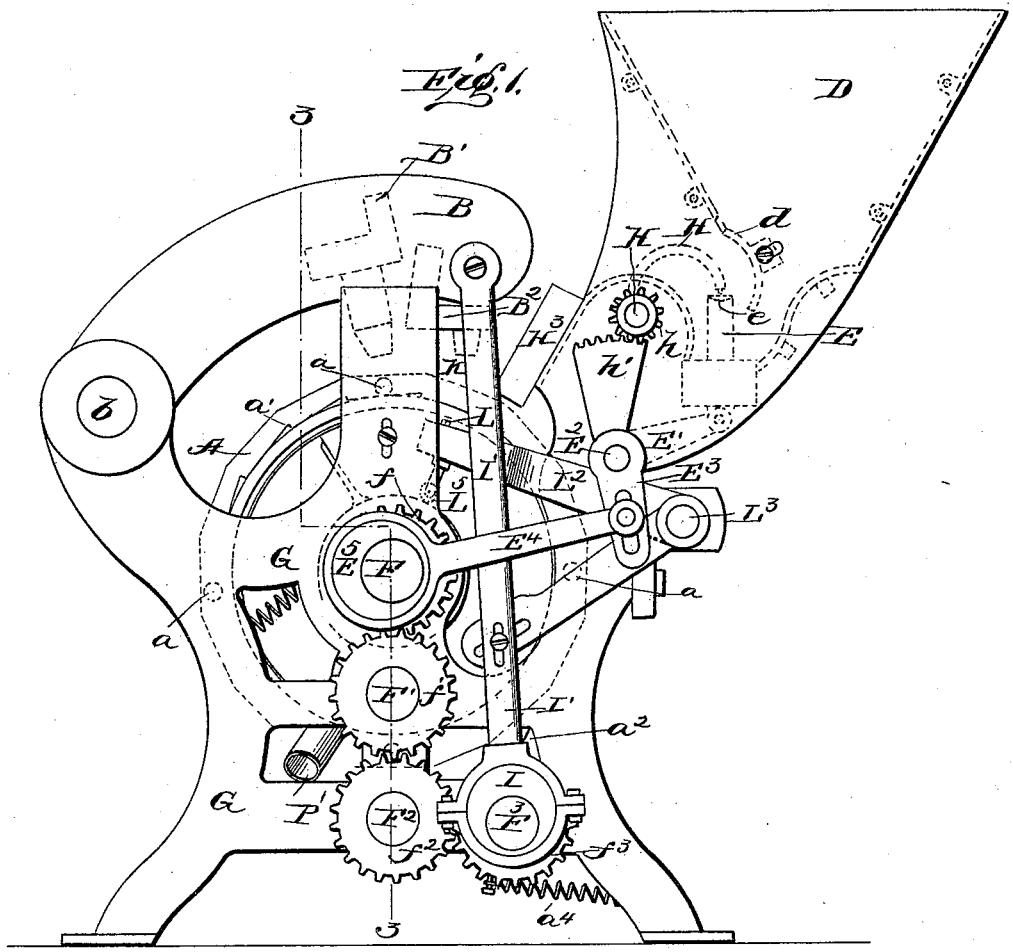
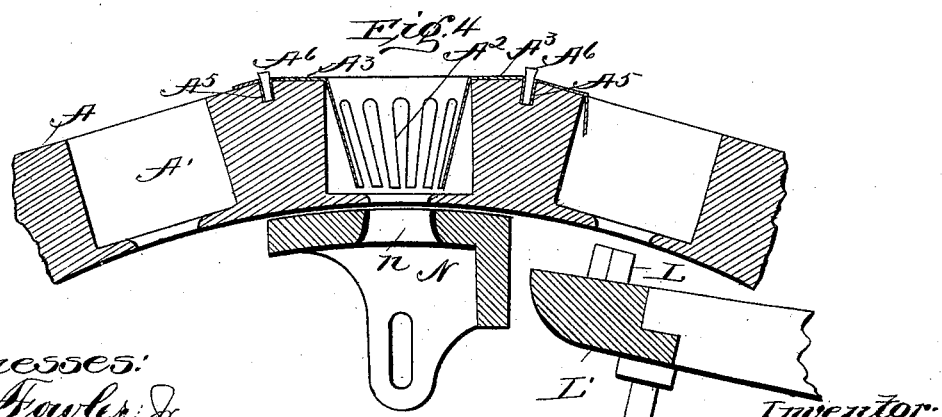
Witnesses:
J. M. Fowler Jr.
Aly Stewart
Inventor:
William B. Fenn,
by Church & Church
his Attorneys.

No. 620,866. Patented Mar. 7, 1899.
W. B. FENN.
RAISIN SEEDER.
(Application filed May 8, 1897.)
(No Model.) 3 Sheets—Sheet 2.
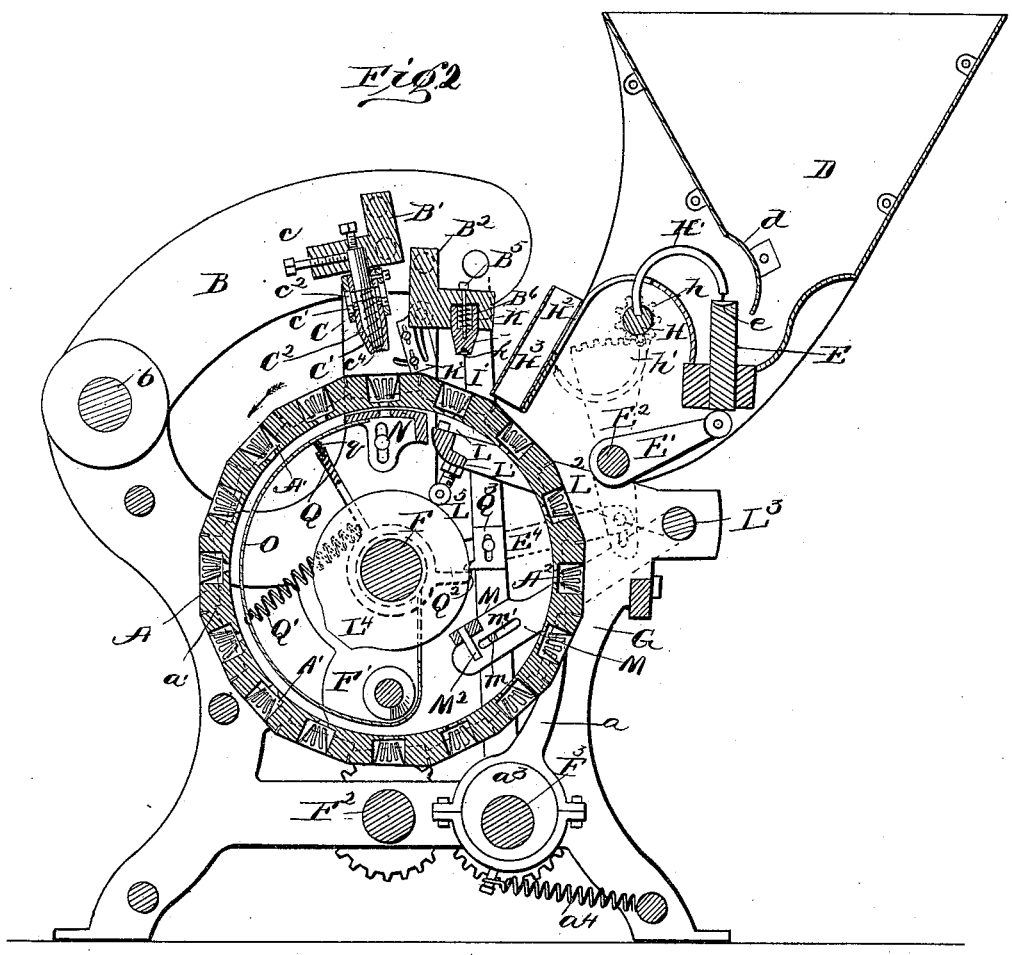
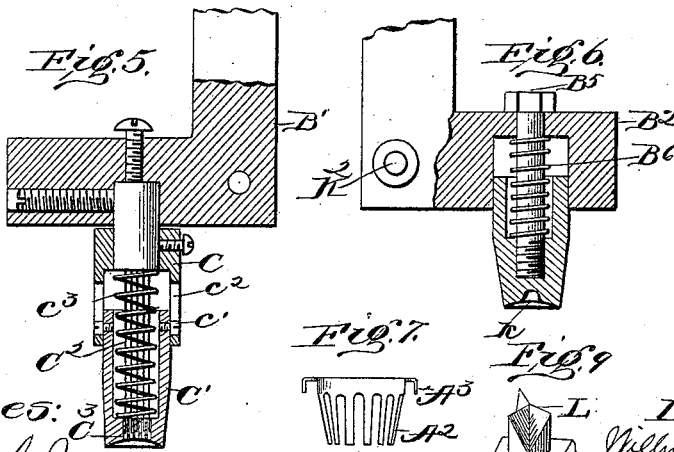
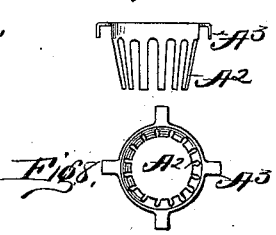
Witnesses:
J. M. Fowler Jr.
Aly Stuart.
Inventor:
William B. Fenn
by Church & Church
his Attorneys.

No. 620,866. Patented Mar. 7, 1899.
W. B. FENN.
RAISIN SEEDER.
(Application filed May 8, 1897.)
(No Model.) 3 Sheets—Sheet 3.
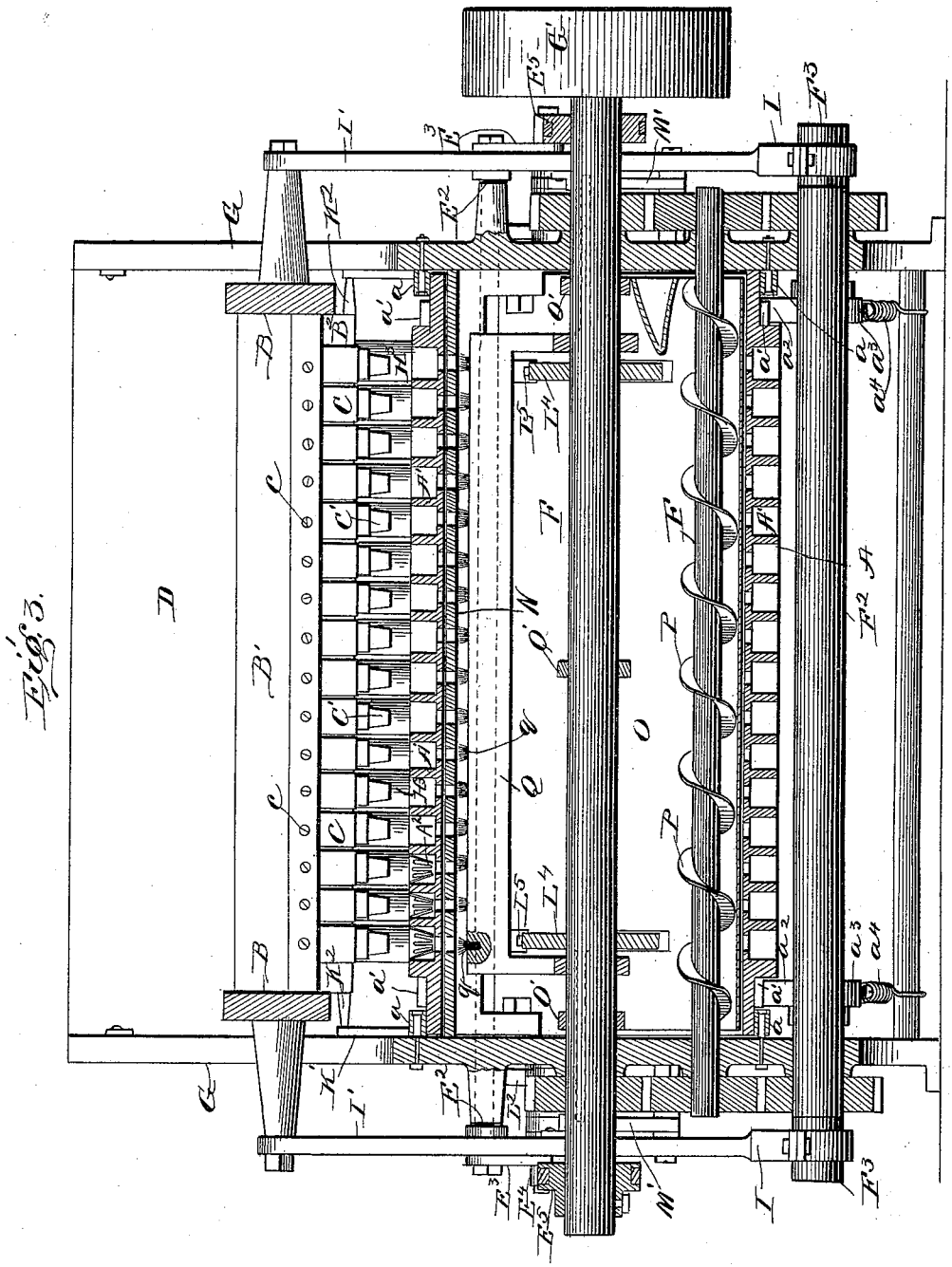
Witnesses:
J. M. Fowler Jr.
Alex Stewart
Inventor
William B. Fenn,
by Church & Church
his Attorneys.

UNITED STATES PATENT OFFICE.

WILLIAM B. FENN, OF DORRANCETON, PENNSYLVANIA, ASSIGNOR TO THE MONARCH SEEDER COMPANY, LIMITED, OF KINGSTON, PENNSYLVANIA.

RAISIN-SEEDER.

SPECIFICATION forming part of Letters Patent No. 620,866, dated March 7, 1899.

Application filed May 8, 1897. Serial No. 635,652. (No model.)

*To all whom it may concern:*

Be it known that I, WILLIAM B. FENN, of Dorranceton, in the county of Luzerne and State of Pennsylvania, have invented certain new and useful Improvements in Raisin-Seeders; and I do hereby declare the following to be a full, clear, and exact description of the same, reference being had to the accompanying drawings, forming a part of this specification, and to the letters of reference marked thereon.

This invention has for its object to provide a machine for automatically feeding and removing the seed from raisins and like fruits by what might be termed a "continuous" process; and the invention consists, primarily, in a machine having a series of receiving and carrying receptacles with centering and extracting mechanism working into said receptacles successively and a feeder for conveying the fruit to the receptacles.

Further, the invention consists in a raisin-seeding machine having a raisin-carrying receptacle and coöperating centering and extracting mechanism, together with a feeder consisting of a finger for engaging and lifting a single raisin at each excursion, with means for removing the raisin from said finger and depositing the same in the receptacle.

The invention further consists in certain novel details of construction and combinations and arrangements of parts, both of the seeding mechanism proper and the feeding mechanism, all as will be hereinafter described, and pointed out particularly in the appended claims.

Referring to the accompanying drawings, Figure 1 is an end elevation of a machine constructed in accordance with my present invention. Fig. 2 is a section taken transversely through the machine. Fig. 3 is a longitudinal section on the line 3 3, Fig. 1. Fig. 4 is an enlarged detail section showing one of the raisin-receptacles completed and in position over the die, together with the slitter or knife. Fig. 5 is a detail section through one of the needle-heads or extractors. Fig. 6 is a similar view through one of the pressing-heads. Figs. 7 and 8 are a vertical section and a top plan view, respectively, of one of the centering-baskets. Fig. 9 is a perspective view of one of the knives or slitters which coöperate with the pressing-head to break the skin of the raisin on the under side.

Like letters of reference in the several figures indicate the same parts.

In carrying my present invention into practice I provide a carrier, preferably a rotary carrier, containing a series of pockets or receptacles, each adapted to receive a raisin from the feeding mechanism and to present the same to a centering and extracting mechanism, which operating in the top of the carrier against the flesh of the raisin serves to hold the raisin in place and force the seed through the bottom of the raisin and out of the carrier, where they fall to a receptacle or conveyer, while the raisin itself or the flesh thereof remains in the carrier until it subsequently drops out or is removed by appropriate mechanism. Each of the receptacles contains in itself a centering mechanism which serves not only to center the raisin so that the seed will be presented properly to the extracting mechanism but also return the raisin to its original shape after the seed are extracted therefrom. The extracting mechanism for the seed consists generally of a head adapted to enter the receptacle, spread the raisin over an aperture in the bottom of the receptacle, and a series of needles adapted when the raisin is so held to penetrate the body of the raisin and force the seed therefrom through the aperture over which it is centered and preferably through slits previously formed in the under skin of the raisin by a cutting or slitting mechanism coöperating therewith prior to the action of the extracting-needles. For the purpose of automatically feeding the raisins to the receptacles one at a time I preferably provide a hopper, into which the raisins are placed in bulk, and from which an elevator or series of elevators is adapted to project and carry upon its or their ends a single raisin, the area of each of the elevators being only sufficient to allow a single raisin to rest thereon, with a finger or series of fingers for removing each of the raisins from the elevator or elevators and dropping the same into a chute or chutes leading down in position to discharge into a receptacle or receptacles as it or they pass beneath the chute or chutes.

Referring particularly now to Figs. 1 and 2, it will be seen that in the form of the machine shown I provide a cylindrical carrier (lettered A) of a proper diameter to contain a number of receptacles and of a length sufficient to give the machine the capacity desired. This cylindrical carrier is mounted in large end bearings, preferably formed by antifriction-rollers $a$. It is rotated intermittingly by a ratchet mechanism consisting of a series of teeth $a'$, with which a pawl $a^2$, driven by an eccentric $a^3$ on one of the shafts of the machine coöperates, as will be presently described. The pawl is held to its work preferably by a coil-spring $a^4$, as shown. In the surface of the cylinder or carrier A there is formed a series of pockets or receptacles A', each having a central aperture at the bottom of reduced diameter, as shown clearly in the enlarged detail Fig. 4. In the preferred construction each receptacle contains a series of spring-fingers $A^2$, converging downwardly or toward the center of the cylinder for the purpose of centering a raisin or other article dropped into the receptacle over the bottom aperture, such spring-fingers preferably constituting what I shall herein term a "centering-basket," and while I have shown the same formed of sheet metal secured by lateral projecting flanges $A^3$ it will be understood that the specific construction and manner of mounting the spring-arms may be varied to suit the particular fruit being operated upon or the substantial use to which the machine is put, the function being, as before stated, first, to center the fruit over the central aperture and hold it in place, and, secondly, to return the fruit to its original shape or a "hunched" condition after having been flattened out by the centering and seed-extracting mechanism.

Above the cylinder and in position to enter the receptacles I mount, preferably in a reciprocating frame, centering or extracting heads or mechanism proper, and, as shown, such reciprocating frame is formed by a pair of pivoted arms B, jointed to the frame at $b$ and carrying between their outer ends longitudinal supports or angle-bars B' B² for the various heads which coöperate with the fruit in the basket or receptacle. The bar B' carries a series of holding and extracting heads, each of which (see Fig. 5) is formed by a base C, clamped and adjustably mounted in the bar B' by screws $c$ and having sliding within it a spring nose-piece C', held in place by screws $c'$, working in slots $c^2$ in the base C. This movable portion of the head is held in its extended position by a spring $c^3$, and its lower end or operative face is concaved or hollowed out, as shown at $c^4$, whereby the edges are adapted to first distend the spring fingers or baskets in the receptacles and subsequently flatten out the raisin held therein and hold the same by pressing the raisin firmly around the aperture in the bottom of the receptacle. The concavity $c^4$ tends to force the seed to the center or over the before-mentioned aperture. Secured in the base of the head C is a series of needles $C^2$, adapted to rest normally with their points just within apertures $C^3$ in the spring-pressed end of the nose-piece C'. Thus when said head descends and holds a raisin, as before explained, a further descent of the base of the head will cause said needles to project and penetrate the raisin, forcing the seed therefrom and through the aperture in the base or bottom of the receptacle. In other words, the spring-pressed end of the head is arrested in its motion, and the pressure of the spring holds the raisin in position while the needles and base of the head continue to move downwardly, and the points of the needles are thereby caused to pass through the raisin, as just explained.

With the mechanism thus far described it will be understood that if a suitable intermittent rotation is given the cylinder to feed the receptacles past the extracting-heads, and if the extracting-heads are properly reciprocated and the raisins fed to the receptacles by hand or otherwise an efficient extractor will be formed; but in order to perfect the machine and render it automatic and more certain in its action I provide detail mechanism, as before explained, for feeding the raisins automatically and, further, a mechanism for cutting the raisins on the under side or sides through which the seed are expelled, together with other details and driving mechanism, as will be now explained.

At one side of the machine I locate a hopper D, having an adjustable gate $d$ at the bottom for regulating the rate of feed, and slightly to one side of the feed-opening and in position to receive the raisins passing through said opening I form a series of vertically-movable elevators E, having their upper ends slightly concaved at $e$ and adapted when moved upward to the position shown in Figs. 1 and 2 to carry on their upper ends each a single raisin, the area of the upper end being insufficient to permit more than one raisin to rest thereon at one time. These elevators are reciprocated by means of bell-crank arms E', mounted on a shaft E², driven through the medium of a crank-arm E³ and a link E⁴, having its inner end connected by a strap with an eccentric E⁵ on a central drive-shaft F, which latter is journaled in the frame and receives its motion from a belt-wheel G' or from other suitable source of power. Immediately in front of the elevators there is located an oscillatory shaft H, oscillated through the medium of a gear-wheel $h$ and a segment $h'$, carried by the shaft E², and upon this shaft H there is mounted a series of fingers H', each having a pointed end adapted when turned to the position indicated in Figs. 1 and 2 to coöperate with and penetrate the raisins lying on the elevators and when turned to the position indicated in dotted lines, Fig. 2, to discharge said raisins by scraping them off against the sides of the slots H² in the chutes H³ and through which said fingers H' work, allowing said raisins to drop down through said chutes into the receptacles in the cylinder, which pass immediately beneath the lower open ends of the chutes.

The drive-shaft F communicates its motion by means of cog-wheels $f$, $f'$, $f^2$, and $f^3$ to the shafts F', F², and F³, respectively, and upon the ends of the shaft F³ eccentrics I are mounted, which eccentrics I communicate an oscillatory or reciprocatory movement to the frame B through the medium of connecting-links I', as shown clearly in Fig. 1.

The positions of the eccentrics I and $a^3$ upon the shaft F³ are such that the cylinder or carrier A is caused to commence its movement as the frame B is raised sufficiently far to disengage the extracting-heads from the receptacles, and such motion of the cylinder ceases at the moment when a new receptacle or series of receptacles is in position and before the extracting-heads begin to enter such receptacles.

Intermediate the chutes H³ and the extracting-head and upon the bar B², I mount a series of spring-pressed heads K, Fig. 6, having their operative ends concaved and recessed, as at $k$, such heads when the frame B descends being adapted to enter the receptacles in which the fruit has just been deposited and prior to the action of the extracting-heads, the proper motion of the heads K being secured by pivotally mounting the bar B² in the frame B and guiding its lower side by an adjustably-slotted guide-plate K', mounted on the frame, and a pin K², Fig. 3, on the lower side of the bar B². When said head or heads K enter the aforesaid receptacles, they spread the raisins therein and hold them in position with the seed centralized for the action of a slitting mechanism consisting of a series of three-cornered slitting-knives L, Fig. 9, mounted on the longitudinal bar L', and adapted to enter the apertures in the bottom of the receptacles from within the cylinder, such motion of the slitting-knives being preferably secured by mounting the bar L, upon arms L² carried by a shaft L³, journaled in the frame, and a cam L⁴ on the shaft F, with which an antifriction-roller L⁵ on said bar L' is adapted to coöperate. The motion of the bar L' and knives or slitters carried thereby is preferably timed to take place when the spring-pressed head K has the fruit pressed against the aperture in the bottom of the receptacle, and the extent of such movement is sufficient to cut or slit the under skin of the fruit, while the upper skin of the fruit is left intact.

At the bottom of the cylinder and extending longitudinally within the same there is located a second bar M, carried by arms M', journaled on the shaft L³ and adapted to be oscillated by the links I', for which purpose pins $m$ are mounted on said links and work in slots $m'$ in the arms M'. The bar M carries a series of discharging-pins M², adapted, when the bar is depressed, at which time, it will be remembered, the cylinder is stationary, to enter the apertures in the bottoms of the receptacles at that point and discharge any fruit or raisins which might have hung therein or failed to have dropped out by gravity.

To further facilitate the action of the extracting mechanism, I preferably locate at the top of the cylinder a stationary bar N, adjustable toward and from the inner surface of the cylinder and having a series of apertures $n$ therein, Fig. 4, adapted to register with the apertures in the bottoms of the receptacles when at the extracting-point, said apertures $n$ being preferably flared or enlarged downwardly, while the upper edges of the apertures in the receptacles are rounded, as shown, to facilitate the entry of the needles and a proper holding of the fruit at the extracting-point. From the stationary bar a casing O extends around within the cylinder at the bottom, said casing being passed around the shaft F' and extended up and attached to collars O' on the shaft F, thus forming a receiver for the seed discharged by the extracting mechanism through the die-bar.

The shaft F' is provided with a screw-conveyer or worm P, adapted, as said shaft is rotated, to carry the seed to the right-hand end of the machine, Fig. 3, and discharge the same through a spout or chute P', Fig. 1, although it will be understood that the seed may be otherwise disposed of or caught differently, if so desired.

To insure the clearing of the seed from the ends of the needles, said needles are given a movement which will cause their ends to project flush with the bottom surface of the die-bar, and at the instant when they are in this position I provide a wiper, which passes across beneath the die-bar with a sudden movement and knocks or carries the seed away from the needles. This wiper consists of a long plate Q, journaled on the shaft F at each end and provided with a series of brushes or upwardly-extending needles $q$, one in line with each of the apertures, adapted to be held in the positions shown in Figs. 1 and 2 by a spring Q' and to be moved across the apertures and released at the proper moment by arms Q², extending out at each end of the machine and adapted to engage the under surface of adjustable projections Q³ on the links I'. The movement of the links is such that as the heads are drawn down the wiper will be caused to advance against the tension of its spring Q', and at the moment when the heads are at their lowermost position the link I' moves laterally a sufficient distance, by reason of the action of the eccentric to which its lower end is connected, to release the arm Q² and allow the wiper to fly back under the tension of its spring Q', thereby effectually removing the seed from the needles and discharging the same into the casing O.

By reference to Fig. 6 it will be seen that the head K is mounted to slide vertically in an aperture in the bar B² and is held by a bolt B⁵, with a spring B⁶ for advancing the same.

By reference to Figs. 7 and 8 it will be seen that in the preferred construction the centering-baskets or spring-arms are formed of sheet metal stamped up into shape, with the projecting flanges A³ downturned at the ends to enter apertures A⁵ in the cylinder A, where they may be held in pairs by pins A⁶, Fig. 4.

With a machine embodying the mechanism hereinbefore described it will be seen that the seeding operations are carried on practically continuously, the raisins being taken from a bulk, placed in the hopper, automatically separated, and fed one at a time to the seed-extracting mechanism, and in operation the sequence of steps is as follows: The raisins are lifted singly on the elevators and from thence carried by the transferring-fingers to the chutes or guides for depositing them in the receptacles. As the cylinder carrying the receptacles moves forward, the raisins are first subjected to the action of the centering and pressing heads, which open the baskets or spring-fingers and spread the raisins over the bottom of the receptacles, at which moment the slitting-knives come into action and slit the under skin. The pressing-heads and knives being then withdrawn, the cylinder and receptacles are again moved, bringing the raisins beneath the centering and extracting heads and over the die-bar. The centering and extracting heads then descend again, spreading the raisins over the bottom of the receptacles and forcing the seed through the slits previously formed, at which moment the wiper comes into action and discharges the seed into the interior casing, from whence the seeds are carried out by the conveyer. The raisins remain in the receptacles, and as the heads are withdrawn the baskets or spring-fingers cause the raisins to assume a rounded form again, and upon the further rotation of the cylinder and receptacles the raisins either drop out by reason of their own gravity or are forced out by the discharging mechanism. At the same time that the centering and extracting mechanisms are operating on the raisins in one line of receptacles the centering and slitting mechanisms are acting on the raisins in the next preceding line, and as the cylinder is fed forward again the raisins are deposited in the receptacles, which will subsequently arrive in position for the centering and slitting mechanism.

Having thus described my invention, what I claim as new is—

1. In a raisin-seeder, the combination with an apertured raisin-support, of a tubular extracting-head having a tubular movable nose-piece provided at its closed end with a plurality of needle-openings, and a bunch of extracting-needles rigidly fitted to the head and entirely housed within the latter and its movable nose-piece, said needles having points working through the needle-openings, substantially as set forth.

2. In a raisin-seeder, the combination with an apertured raisin-support, of a tubular extracting-head having a tubular movable nose-piece provided at its closed end with a plurality of needle-openings, a bunch of extracting-needles rigidly fitted to the head and housed entirely within the same and its nose-piece, each needle working within one of the needle-openings, and a spring encircling the bunch of needles and also housed within the extracting-head and the nose-piece thereof, substantially as set forth.

3. In a raisin-seeder, a raisin support or carrier, having a series of receptacles or pockets provided with reduced apertures in their bases, centering-baskets fitted within the receptacles or pockets, and having a plurality of yielding fingers converging over said apertures and having their extremities lying in close proximity to the bases of the receptacles or pockets, and seed-extracting heads carrying needles adapted to pass through the receptacles or pockets and the apertures thereof, substantially as set forth.

4. In a raisin-seeder, a raisin support or carrier having a series of receptacles or pockets, centering-baskets fitted within the receptacles or pockets and formed of a single blank of sheet metal having a plurality of yielding inwardly-convergent straight fingers and lateral projecting flanges secured to the outer face of the support or carrier, and seed-extracting heads carrying extracting-needles, substantially as set forth.

5. In a raisin-seeder, the combination of a movable carrier having a series of raisin receptacles or pockets therein, seed-extracting mechanism, chutes arranged over the carrier, a hopper arranged beyond the carrier, and transferring mechanism located in the space between the hopper and carrier and having means for carrying individual raisins bodily from the lower end of the hopper and directing the same into said chutes, substantially as set forth.

6. In a raisin-seeder, an apertured raisin-support, a slitter arranged to operate against the under side of the raisin to slit the skin, means for holding and centering the raisin while the slitter is in action, and a seed-extractor arranged to work through the apertures at a point in advance of the slitter to provide for forcing the seed through the slitted or broken skin, substantially as set forth.

7. In a raisin-seeder, the combination of a cylindrical rotary carrier having a series of apertured receptacles or pockets in its periphery, chutes arranged over the carrier, a hopper arranged beyond the carrier, a plurality of reciprocatory elevators arranged at the lower end of the hopper and adapted to elevate single raisins on their upper ends, a series of oscillatory pointed transferring-fingers adapted to transfer the raisins from said elevators to said chutes, and centering-heads arranged in alinement in rear of the chutes and adapted to press against the raisins when advanced beyond the plane of the latter, substantially as set forth.

8. In a raisin-seeder, an apertured raisin-support, a slitter arranged to operate through the apertures against the under side of the raisin to slit the skin, and independent extracting-needles arranged to work through the apertures at a point in advance of the slitter to provide for forcing the seed through the slitted or broken skin, substantially as set forth.

9. In a raisin-seeder, an apertured raisin-support, a slitter arranged to operate through the apertures against the under side of the raisin to slit the skin, a holding and centering head arranged to coöperate with the slitter for holding the raisin while the latter is in action, and independent extracting-needles arranged to work through the apertures at a point in advance of the slitter to provide for forcing the seed through the slitted or broken skin, substantially as set forth.

10. In a raisin-seeder, the combination with the apertured carrier and slitter working through the apertures therein on the under side, of the movable head for holding the raisins over said aperture, the independent head for subsequently holding said raisins and the extracting-needles working through said last-mentioned head and the apertures; substantially as described.

11. In a raisin-seeder the combination with the apertured carrier, the slitter working through said apertures on the under side and the spring-pressed head having the centering-concavity in its operative face adapted to bear on the raisins and hold the same while being cut, of the independent extracting-needles working through said apertures from the upper side; substantially as described.

12. In a raisin-seeder, the combination with the carrier having the apertured receptacles or pockets therein, the centering-fingers in said pockets and the extracting-needles working through the apertures, of the centering and holding heads and the slitters coöperating with said heads through the apertures for cutting the under skins of the raisins; substantially as described.

13. In a raisin-seeder, the combination with the carrier having the series of apertured pockets or receptacles therein and the yielding centering-baskets located in said pockets, of the coöperating holding-head and slitter, the extracting-needles and the independently-movable head surrounding said needles; substantially as described.

14. In a raisin-seeder, a raisin support or carrier having apertured receptacles or pockets therein a stationary bar underlying the support or carrier and having a series of corresponding apertures therein, extracting-heads carrying needles adapted to pass through the alined apertures, and a movable wiper arranged to reciprocate across the plane of the alined apertures when the needles are projected therethrough, said wiper having yielding surfaces to engage against the needles, substantially as set forth.

15. In a raisin-seeder, a raisin support or carrier having apertured receptacles or pockets therein, extracting-heads carrying needles adapted to pass through the apertures, and an oscillatory wiper adapted to be moved against said needles and provided at its upper edge with a series of spaced upwardly-extending brushes, substantially as set forth.

16. In a raisin-seeder, the combination with the frame, the cylindrical carrier journaled therein and having a series of peripheral pockets or receptacles with reduced apertures at the bottom and the oscillating extracting-heads supported in the frame, of the slitters or cutters working within the cylindrical carrier and the cam for moving said slitters; substantially as described.

17. In a raisin-seeder, the combination of a cylindrical rotary carrier having apertured receptacles or pockets therein, a swinging frame supported above the carrier and carrying a series of extracting-heads, a bar arranged longitudinally above the carrier and pivotally mounted at its ends in said swinging frame, said bar carrying combined centering and holding heads adapted to bear against the raisins before being operated upon by the extracting-heads, and suitably-arranged guides engaging with said pivoted bar at its ends to provide for turning the same to an operative position, substantially as set forth.

WILLIAM B. FENN.

Witnesses:
C. W. BOONE,
G. M. ROAT.